(12) United States Patent
Wictorin, III et al.

(10) Patent No.: US 11,423,580 B2
(45) Date of Patent: Aug. 23, 2022

(54) DECODING DATA ARRAYS

(71) Applicant: Arm Limited, Cambridge (GB)

(72) Inventors: Bjorn Fredrik Wictorin, III, Helsingborg (SE); Jakob Axel Fries, Malmo (SE)

(73) Assignee: Arm Limited, Cambridge (GB)

(*) Notice: Subject to any disclaimer, the term of this patent is extended or adjusted under 35 U.S.C. 154(b) by 201 days.

(21) Appl. No.: 17/068,738

(22) Filed: Oct. 12, 2020

(65) Prior Publication Data

US 2022/0114761 A1 Apr. 14, 2022

(51) Int. Cl.
| | |
|---|---|
| *G06T 9/00* | (2006.01) |
| *G06T 3/40* | (2006.01) |
| *H04N 19/186* | (2014.01) |
| *H04N 19/65* | (2014.01) |
| *H04N 19/60* | (2014.01) |

(52) U.S. Cl.
CPC .............. *G06T 9/00* (2013.01); *G06T 3/40* (2013.01); *H04N 19/186* (2014.11); *H04N 19/60* (2014.11); *H04N 19/65* (2014.11)

(58) Field of Classification Search
CPC .... G06T 9/20; G06T 7/50; G06T 7/13; G06T 3/602; G06T 9/00; G06T 3/40; G06T 1/60; H04N 19/00278; H04N 19/00951; H04N 7/26; H04N 19/00587; H04N 19/0063; H04N 5/23251; H04N 19/136; H04N 19/124; H04N 19/12; H04N 19/126; H04N 19/15; H04N 19/01; H04N 19/186; H04N 19/60; H04N 19/65; G06F 7/727
See application file for complete search history.

(56) References Cited

U.S. PATENT DOCUMENTS

| | | | |
|---|---|---|---|
| 11,068,268 B2* | 7/2021 | Stephens | G06F 9/3824 |
| 2002/0118885 A1* | 8/2002 | Smeets | G06T 9/00 |
| | | | 382/246 |
| 2019/0141324 A1 | 5/2019 | Bjorklund et al. | |

FOREIGN PATENT DOCUMENTS

WO    2020/115471    6/2020

OTHER PUBLICATIONS

Combined Search and Examination Report dated Apr. 11, 2022, GB Patent Application No. 632114471.2.

* cited by examiner

*Primary Examiner* — Duy M Dang
(74) *Attorney, Agent, or Firm* — Vierra Magen Marcus LLP

(57) ABSTRACT

Disclosed herein is a method and apparatus for determining decoded data values for a data element of an array of data elements from an encoded representation of the array of data elements, wherein the decoding comprises determining which, if any, bits are missing for the data value(s) for the data element and selecting based on this an adjustment scheme to be applied for the data value(s) for the data element from a plurality of available adjustment schemes. Also disclosed are a method and apparatus for generating an encoding hint comprising an indication of the one or more encoding parameters that were used to generate the encoded representation which encoding hint can then be associated with the decoded data and then used when the decoded data is subsequently to be encoded.

20 Claims, 6 Drawing Sheets

(A)             (B)

DECODING DATA ARRAYS

BACKGROUND

The technology described herein relates to methods of and apparatus for determining data values for use by a data processing system from data that has been encoded, e.g. in a compressed format, and in particular to methods of and apparatus for determining data values for use in graphics processing from encoded image data.

Data processing systems often store generated image data within a frame buffer. The frame buffer typically contains a complete set of data for a frame (image), e.g. that is to be displayed, including, for example, colour values for each of the (e.g.) pixels within that frame. A suitable display controller is then able to read the contents of the frame buffer and use the image data stored therein to drive a display to display the desired frame (image).

However, the storage and access of the image data in the frame buffer (the 'frame buffer data') can place relatively high demands on the, e.g., storage and/or bandwidth resource of the data processing system (or conversely lead to a reduced performance when such demands are not met).

To reduce the burden imposed on the data processing system, it is therefore desirable to be able to store such frame buffer data in a "compressed" format. This is particularly desirable in data processing apparatus, e.g. of portable devices such as digital cameras, or mobile devices including such cameras (for example, smartphones, tablets, HMD (Head Mounted Displays, etc.), where processing resources and power may be relatively limited.

Similar considerations apply to various other instances where it is desired to reduce the amount of data needed for the storage and/or transmission of a certain piece of information.

Another example, also in the context of graphics processing, would be when storing texture data, e.g. in the form of an array of texture elements (or 'texels') each representing given texture data (such as colour, luminance, etc. values) that can then be mapped onto respective sampling positions (pixels) of a render output being generated. Again, the storage and access of this texture data can place relatively high storage and/or bandwidth requirements on the data processing system.

Accordingly, it is common to encode arrays of data elements, such as arrays of image data values, so as to compress the data in order to reduce bandwidth and memory consumption. When the data processing system subsequently requires such data that has been stored in such a compressed form, the compressed data must then be decoded before it can be used, e.g. in order to determine a representation of the original (i.e. uncompressed) data values in a format that can then be used by the data processing system.

To this end various data compression schemes have been developed. Some data compression schemes encode the data in a lossless manner such that the original array of data elements can be perfectly reconstructed from the encoded data. This may be desired for applications where it is particularly important to maintain data fidelity.

However, for other applications it may be acceptable to lose some data fidelity and it may be more desirable to be able to (e.g.) guarantee a given bandwidth (bit rate). Thus, other data compression schemes may encode to fixed-size data packets.

In that case, the compression into the fixed size data packets is inherently 'lossy' since once a fixed size data packet is full any remaining bits are not then included into the data packet and those bits are therefore effectively discarded at this point such that the information associated with the discarded bits is lost. This means that the original data values cannot (in general) be perfectly constructed from the encoded data.

However, the Applicants have recognised that there may still be problems when decoding data that has been encoded using such lossy compression schemes, and that there remains scope therefore for improved arrangements for determining data values for a data element of an array of data elements from an encoded representation of the array of data elements, i.e. for decoding data, especially data that has been encoded using lossy compression schemes.

BRIEF DESCRIPTION OF THE DRAWINGS

Various embodiments of the technology described herein described herein will now be described by way of example only and with reference to the accompanying drawings, in which.

Like reference numerals are used for like elements in the drawings as appropriate.

DETAILED DESCRIPTION

Figure 1:
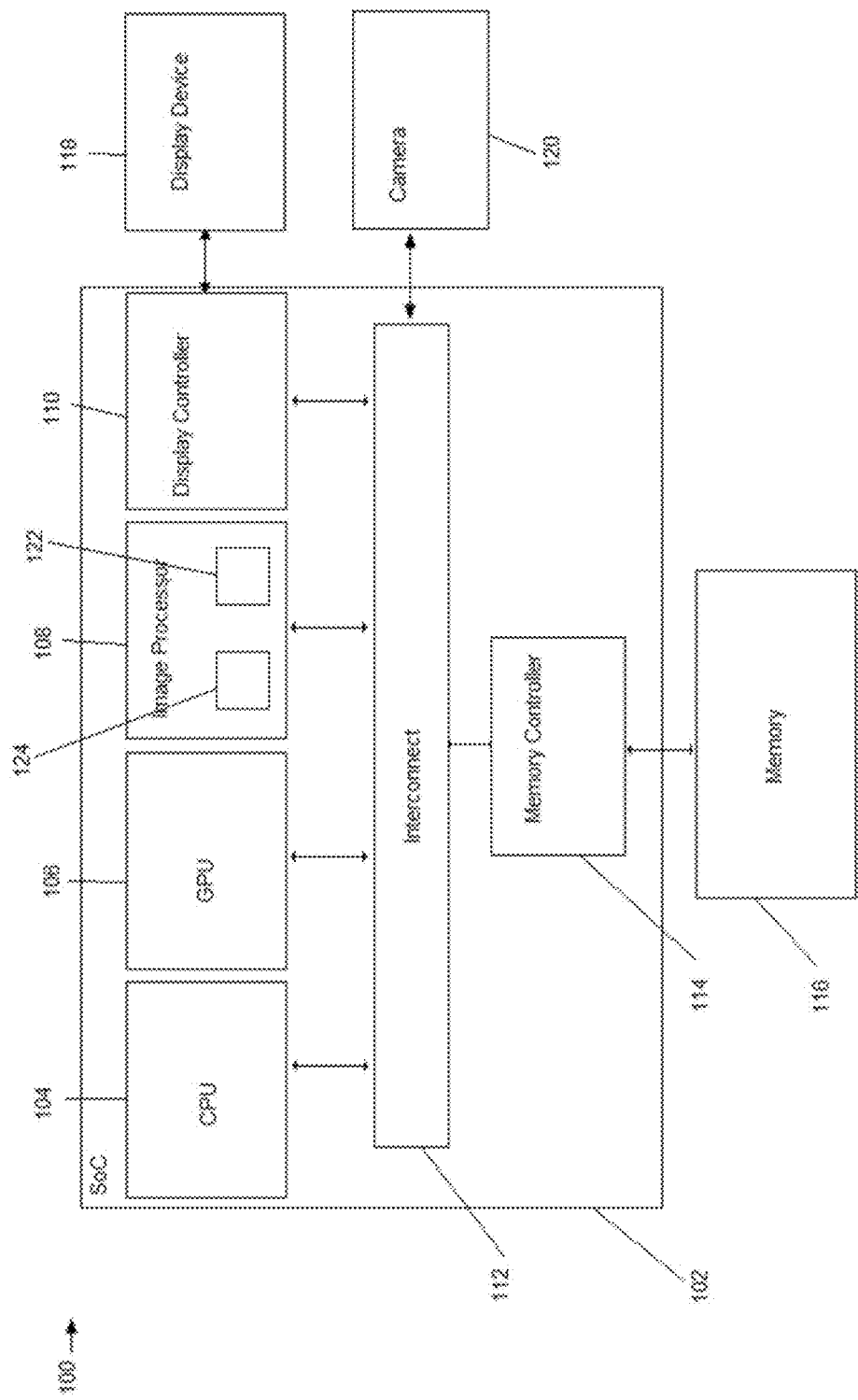
FIG. 1 shows schematically an example of a data processing system within which embodiments of the technology described herein may be implemented.

A first embodiment of the technology described herein comprises a method for determining data values for a data element of an array of data elements from an encoded representation of the array of data elements, wherein each data element in the array of data elements is associated with a respective one or more data values, each data value represented by a respective bit sequence, wherein the encoded representation of the array of data elements represents the data value(s) for at least some of the data elements in the array of data elements using a subset of one or more bits of the respective bit sequences for the data value(s) such that, for those data elements, data indicative of the bit values for one or more other bits of the respective bit sequences for the data value(s) is not stored in the encoded representation;

the method comprising:

decoding the encoded representation of the array of data elements to determine an initial sequence of bits representing the data value(s) for the data element, wherein the initially determined bit sequences for the data value(s) for the data element may have one or more missing bits corresponding to a respective one or more bits for which data was not stored in the encoded representation;

determining which, if any, bits are missing for the data value(s) for the data element;

selecting, in dependence on the determination of which, if any, bits are missing for the data value(s) for the data element, an adjustment scheme to be applied for the data value(s) for the data element from a plurality of available adjustment schemes; and applying the selected adjustment scheme to the data value(s) for the data element to obtain decoded data value(s) for the data element.

A second embodiment of the technology described herein comprises a decoder for determining data values for a data element of an array of data elements from an encoded representation of the array of data elements, wherein each data element in the array of data elements is associated with a respective one or more data values each data value represented by a respective bit sequence, wherein the encoded representation of the array of data elements represents the data value(s) for at least some of the data elements in the array of data elements using a subset of one or more bits of the respective bit sequences for the data value(s) such that, for those data elements, data indicative of the bit values for one or more other bits of the respective bit sequences for the data value(s) is not stored in the encoded representation;

the decoder comprising:

a decoding circuit configured to:

decode the encoded representation of the array of data elements to determine an initial sequence of bits representing the data value(s) for the data element, wherein the initially determined bit sequences for the data value(s) for the data element may have one or more missing bits corresponding to a respective one or more bits for which data was not stored in the encoded representation;

a rounding circuit configured to:

determine which, if any, bits are missing for the data value(s) for the data element;

select, in dependence on the determination of which, if any, bits are missing for the data value(s) for the data element, an adjustment scheme to be applied for the data value(s) for the data element from a plurality of available adjustment schemes; and apply the selected adjustment scheme to the data value(s) for the data element to obtain decoded data value(s) for the data element.

The technology described herein relates to techniques for determining (decoded) data values for data elements of an array of data elements (which may, e.g., comprise an array of image data) from an encoded representation of the data array. In particular, the technology described herein relates to techniques for decoding data arrays that have been encoded in a "lossy" manner, e.g. such that some of the original information may have been discarded during the encoding.

For instance, each of the data values associated with the data elements of the array of data elements may be defined by a respective sequence of bits. However, the effect of the lossy encoding is that (at least some of) the bit sequences may be truncated during the encoding process, e.g., by the encoder discarding one or more bits (e.g., and in an embodiment corresponding to one or more least significant bits), such that data indicative of the bit values for the discarded bits is not stored in the encoded representation of the data array.

One such example of a lossy encoding scheme that may be used in embodiments of the technology described herein is that described in International Patent Application Publication Number WO 2020/115471 (PCT/GB2019/053416) of Arm Limited, the content of which is incorporated herein in its entirety.

In the (lossy) encoding scheme described therein the encoding of a block of data elements involves truncating the bit sequence representations of at least some of the data values for the data elements within the block such that only a subset of one or more bits (e.g., and in an embodiment, a subset of one or more most significant bits) of the respective bit sequence representation of the original data values are stored in the encoded representation of the block of data.

Correspondingly, this means that when a data array that has been encoded in this way is subsequently to be decoded, e.g. when a data processing system wishes to use the data values for an element in the array, the decoding process cannot perfectly recreate the values of the discarded bits, and so the decoded data values resulting from the initial decoding may have one or more 'missing' bits.

To try to better reproduce the original data values from data that has been encoded in this way (i.e. in a lossy manner), various adjustment (e.g. 'rounding' insertion) schemes may be applied as part of the decoding process, e.g. in order to fill in the missing bits, and this is done in the technology described herein. The effect of the adjustment (e.g. rounding) scheme is thus to try to approximate the contribution from any 'missing' bits for which data is not stored in the encoded representation, e.g. any bits that were discarded during the encoding process (and for which missing bits the actual bit values can therefore not be recreated by the decoder).

The adjustment (e.g. rounding) scheme may, for example, involve adding a suitable sequence of rounding bits (e.g. at the end of the truncated bit sequences representing the data values) in place of at least some of the missing bits that were discarded during the encoding. The adjustment schemes that are applied during the technology described herein may therefore, and in an embodiment do, comprise different rounding modes. However, the adjustment that is used may be more or less complex as desired, e.g. depending on the encoding scheme.

The present Applicants have recognised that it may be desirable to apply different adjustments in different circumstances, e.g. rather than using the same, standard adjustment scheme for all data values that are to be decoded. In that respect, the Applicants have recognised that attempting to use a standard adjustment scheme for all data values may not necessarily be appropriate (e.g., optimal), and furthermore at least in some circumstances may lead to a loss of fidelity, as will be explained further below.

Thus, in the technology described herein, the decoder is operable to select an adjustment scheme that is to be used during the decoding process when decoding the data value(s) for a data element from a plurality of available adjustment schemes. For instance, each of the plurality of available adjustment schemes is in an embodiment associated with a certain adjustment, or set of adjustments, that can be applied to the data value(s), e.g., to determine how any missing bits are filled in.

More specifically, the present Applicants have recognised that when using such lossy encoding and decoding techniques, e.g. of the type described above, which of the adjustment schemes should be applied for a data value associated with a particular data element can advantageously be selected based on a "pattern" of missing bits for the data value in question.

Therefore, according to the technology described herein, at least some data values having certain "patterns" of missing bits are in an embodiment adjusted (e.g. rounded) differently than they would otherwise be, e.g. if they had a different pattern of missing bits.

In other words, in the technology described herein there are therefore a plurality of different, available adjustment schemes (each being associated with a different adjustment, or set of adjustments), and which adjustment scheme is to be used for a particular data value, or group of data values associated with a particular data element, is selected based on the missing bits for the data value(s) in question.

In an embodiment the selection of the adjustment scheme is done using a pattern of missing bits that reflects the missing bits for all data values associated with the same data element. Thus, for a particular data value in a group of data values associated with a single data element, the adjustment scheme that is to be used is in an embodiment selected based on the missing bits for the data value itself, as well as the missing bits for the other data values in the group of data values associated with the same data element.

The method may thus comprise a step of determining which bits, if any, are missing for the data value(s) for the data element in question, and the adjustment scheme that is to be applied for the data value(s) is then selected in dependence on this determination.

For instance, in embodiments, there may be a first, "standard" adjustment scheme that is applied in most circumstances, and a second, "exceptional" adjustment scheme that is applied only in some circumstances, e.g. when certain patterns of missing bits are identified (as will be explained further below). In that case, a first adjustment, or set of adjustments, may be applied to the data values associated with a data element that is to be decoded when the first, standard adjustment scheme is used. However, when the second, exceptional adjustment scheme is to be used, a different adjustment is applied for one or more of the data values associated with a data element that is to be decoded than would be applied when using the first, standard adjustment scheme.

However, in general there may be any number of available adjustment schemes, such as two, four, eight, etc., different adjustment schemes, that the decoder may be able to select between when decoding a data element based on the missing bits for the data value(s) associated with the data element, each adjustment scheme involving a respective adjustment, or set of adjustments, to be applied to the data value(s).

In this way the Applicants have found that it may be possible to provide an improved decoding operation, e.g. which provides more accurate decoded data values (i.e. that better match the original data values, particularly after multiple cycles of encoding/decoding), as will be explained further below.

For example, the Applicants have recognised that in such encoding and decoding schemes, it is desired that the image quality will stabilise after a number of encoding/decoding cycles. That is, although there will generally be an initial reduction in image quality due to the lossy nature of the encoding, the image quality should not continue to degrade with each encoding/decoding cycle.

This may be desirable, e.g., for the purposes of benchmarking the encoding/decoding scheme, but also in use where the same piece of data may be repeatedly encoded/decoded within a data processing system, e.g. where the same piece of data has to be passed between different processing units. An example of this would be when generating an image for display where the same piece of image data may be processed, e.g., by a video processor, a graphics processing unit, and a display processer, in turn, with the image data being encoded/decoded between each processing step.

However, the Applicants have recognised that when using lossy compression schemes the adjustment scheme that is applied during the decoding process can in some situations introduce problematic behaviour where the image quality continues to degrade after each cycle of encoding/decoding.

In this regard, the Applicants have found that there may be certain patterns of missing bits that can introduce such problematic behaviour, e.g. depending on the adjustments that are applied, as well the potential interplay between the adjustments with any further optional decoding steps (such as data transforms, etc.), as will be explained further below.

In an embodiment the technology described herein therefore further recognises that it is possible for the decoder to determine a pattern of missing bits associated with a data element that is to be decoded, e.g., and to thereby identify any such instances of patterns of missing bits that may lead to problematic behaviour.

Thus, in embodiments, when the decoder identifies that a data element is associated with a problematic pattern of missing bits, the data element can then be handled exceptionally, e.g., and particularly, by using a different adjustment scheme such that a different adjustment is applied at least for the data value(s) associated with the data element for which the problematic behaviour is expected to occur. Thus, when the decoder identifies that a data element has a problematic pattern of missing bits, rather than using the standard adjustment scheme that the decoder would otherwise use for the data value in question (e.g. if there was a different pattern of missing bits), the decoder can use a different, exceptional adjustment scheme that applies a different adjustment, e.g. such that the problematic behaviour does not occur.

Thus, in embodiments, an adjustment scheme is selected that doesn't necessarily attempt to reproduce the original image as accurately as possible (as may be the case for the decoder's standard heuristics) but instead is intended to ensure that a specific problematic behaviour, e.g. as described above, is avoided.

In this way the problem of the image quality continually degrading with each encoding/decoding cycle can in embodiments be prevented, to thereby provide an improved, e.g. more stable encoding/decoding arrangement. In other words, the technology described herein may at least in its embodiments provide improved, e.g. more accurate decoded values even after multiple cycles of encoding/decoding.

In the situation described above, the patterns of missing bits that lead to such problematic behaviour will in general depend on the decoding scheme.

For instance, in one example, corresponding to an embodiment of the technology described herein, the array of data elements represents an array of image data that is provided in (e.g.) RGB(A) format, but which is transformed into a different, e.g. YUV, colour format for encoding.

In that case, each data element in the array of data elements may correspond to a particular pixel in the image, and may be associated with a group of three (or four) data values, e.g. representing the RGB(A) channels.

In order to convert the data values into a suitable format for encoding, the encoding in this embodiment thus comprises a step of transforming the RGB(A) data values into YUV colour space. In an embodiment this step involves multiplying the array of RGB(A) data values by one or more suitable colour transform matrix. However, various arrangements for converting the RGB(A) data values into YUV colour space would be possible and embodiments may use any suitable conversion scheme, as desired. The conversion may be performed either in a lossless or lossy manner.

Correspondingly, when data that has been encoded in this way is to be decoded, after the initial decoding and rounding adjustment has been performed to determine a set of decoded values (e.g.) in the YUV colour format, a suitable inverse colour transform is applied in order to transform the initially decoded values (in the (e.g.) YUV colour format) into the desired (e.g.) RGB(A) data format for use by the data processing system.

In this case, the Applicants have found that for certain patterns of missing bits within the group of colour values in the initially decoded (e.g.) YUV colour format, when the group of colour values in the initially decoded format are to be subsequently (inverse) transformed back into their original (e.g.) RGB(A) format, there can be a potential interplay between the inverse colour transform and the rounding adjustment that may cause one or more of the colour values to increase after each encoding/decoding cycle.

When such problematic patterns of missing bits are identified, the decoder when operated according to an embodiment of the technology described herein can then apply a special case rounding adjustment to at least the colour value (or values) where the problematic behaviour occurs in order to prevent the problematic behaviour.

In particular, the Applicants have found that in such cases there are certain patterns of missing bits for the group of data values associated with a data element that if the rounding were to set the least significant bit for one of the data values (colour channels) in the group to '1', this may cause that data value to continue to grow with each encoding/decoding cycle, and therefore become progressively further removed from the original ('true') data value.

In the technology described herein, the decoder is thus able to identify such instances, and apply a different adjustment scheme, e.g., and in an embodiment, that exceptionally always sets (at least) the least significant bit for the data value for which the problematic behaviour may otherwise occur (e.g. if the standard adjustment scheme caused it to be rounded to '1') to '0'. In this way the problematic behaviour described above can be avoided.

However, in general it is expected that there may be various other situations where the interplay between the patterns of missing bits and the adjustment, as well as optionally any further transforms, etc., can introduce similarly problematic behaviour that can be addressed by the techniques of the technology described herein. Once such problematic behaviour has been identified, the appropriate adjustment scheme can be determined to avoid the problematic behaviour.

Further, whilst one specific example of problematic behaviour that may be addressed by the technology described herein has been provided above for illustrative purposes, it will be appreciated that the technology described herein is not limited to this situation, and there may be other situations where it is beneficial to perform different adjustments depending on the patterns of missing bits in the manner of the technology described herein.

In this way it will be appreciated that the technology described herein is able to provide improved decoding arrangements.

In any of the embodiments described herein the array(s) of data elements may take any desired and suitable form. Thus, although an example has been given above in the context of image data, and particularly image data in RGB (A) format (but which is in an embodiment transformed into YUV colour space for encoding purposes), it will be appreciated that the technology described herein is not limited to such data and can generally be used when processing any suitable image or non-image data, as desired. Thus, whilst embodiments relate to data array(s) including image and/or video data, other examples of data array arrangements would be possible if desired and in general the array(s) of data elements may comprise any data array that can suitably or desirably be stored in an encoded representation that can be decoded according to the technology described herein.

The array(s) of data elements in an embodiment represent a spatial distribution of values (at least in their original, uncompressed format, e.g. the format in which the array(s) of data elements may ultimately be used, e.g. in the overall data processing system). That is, the array(s) of data elements in an embodiment represent a set of data values that are distributed in the spatial domain. So, each data element may represent a data value at a certain position within the spatial distribution. Thus, in embodiments, the array(s) of data elements may (each) correspond to an array of data positions.

However, in some embodiments, the encoding comprises transforming the spatially distributed values into the frequency domain. This may facilitate an improved encoding process. In that case, the data values that are stored for the encoded representation rather than representing a spatial distribution of the values represent the distribution of the values in the frequency domain.

Correspondingly, the decoding in an embodiment comprises an inverse frequency transform.

In embodiments, the array(s) of data elements or positions may correspond to all or part of a desired (e.g. image) output, such as a still image or a video frame (e.g. for display). That is, the array(s) of data elements in an embodiment comprise array(s) of image data, i.e. data that may be used to generate an image for display. Thus, an array of data may in embodiments correspond to a single still image that is to be encoded. In other embodiments an array of data may correspond to a video frame of a stream of video frames that are to be encoded.

In an embodiment, each data element in the array of data elements is associated with a respective group of plural data values. Thus, in an embodiment, each data element in the array of data elements is associated with a respective group of data values, wherein each data value in the group of data values for a data element is in an embodiment defined by a respective sequence of bits.

For instance, in some embodiments the array(s) of data elements comprise array(s) of colour image data, as mentioned above. In that case the data elements may each represent sampling positions, or pixels, within the image, and each data element may be associated with a group of colour values. The group of data values for a data element may represent values for different colour channels.

The data values for the encoded representation may generally be defined in a first, uncompressed data format corresponding to a format used by the encoder (but that need not correspond to the original data format, i.e. the data format in which the data values are used by the data processing system). For example, where the first, uncompressed data format is a YUV colour format, the data values stored in the encoded representation may represent values for the Y, U and V components. The data values in the first, uncompressed data format resulting from the decoding may therefore need to be converted into a second, uncompressed data format (e.g. a RGB(A) data format) for use by a data processing system. (In embodiments where the encoding comprises a frequency transform, the data values stored in the encoded representation rather than representing the values for the Y, U and V components themselves, may represent a set of frequency transformed values, and in that case the decoded values may need to be transformed in both colour and frequency space.)

In general, there may be any desired and suitable correspondence between the data elements and the desired output. For example, the data elements in the array may each correspond to a pixel or pixels of a desired output. The array of data elements can be any desired and suitable size or shape in terms of data elements or positions, but is in an embodiment rectangular (including square). The data elements may represent two-dimensional data, but could also represent one-dimensional, three-dimensional, or higher-dimensional data. The data elements may also have any desired and suitable format, for example that represents image data values (e.g. luma or colour values).

In any of the embodiments described herein, the array(s) of data elements may be provided in any desired and suitable way. Embodiments may comprise generating (at least some or all of) the data elements of the array(s). Embodiments may also or instead comprise reading in (at least some or all of) the data elements of the array(s), e.g. from memory.

The data elements of the array(s) may be generated in any desired and suitable way. In embodiments, the data elements of the arrays may be generated by a camera such as a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processor (a graphics processing pipeline) may be used in order to generate the data elements of the arrays. The graphics processing pipeline may contain any suitable and desired processing stages that a graphics pipeline and processor may contain, such as a vertex shader, a rasterisation stage (a rasteriser), a rendering stage (a renderer), etc., in order to generate the data elements of the arrays.

In the technology described herein the data elements of the data array(s) are in an embodiment encoded as "blocks" of data elements, e.g. on a block by block basis. For instance, the array(s) of data elements may be divided into plural source blocks to be encoded on a block by block basis. Thus, any reference herein to processing or encoding a data array or data elements of a data array should be considered to include, and typically involves, processing or encoding such blocks of data elements. A "block" may generally comprise an N×N array of data elements.

Thus, when encoding an (overall) array of data elements, e.g. representing an entire frame (image), the (overall) array of data elements is divided into a plurality of blocks, and each block is then encoded according to the encoding scheme of the technology described herein to provide a corresponding set of data packets. In the embodiments, each block of data elements within the larger array of data elements is encoded (compressed) into a fixed size data packet.

Thus, in an embodiment, the block of data elements that is being encoded into a fixed size data packet comprises a block of data elements from a larger, overall, data array (and this is in an embodiment repeated for each of the plural blocks making up the overall data array). The data packets for each of the blocks can then be suitably combined, in a certain order, into an encoded data stream representing the overall array of data elements.

Thus, the technology described herein is in an embodiment a block-based scheme, with each block in an embodiment being independently encoded, such that blocks can then be independently decoded. This may facilitate random access to blocks within frames that have been encoded using the technology described herein. For instance, it will generally be known how many bytes there are per data packet (block), and the location of individual blocks within memory can therefore easily be identified, such that they are easy to load and to random access.

The data elements may comprise difference values, e.g., compared to a reference frame or block. However, more often, the encoding/decoding schemes described herein are used for encoding raw data, and the data elements may therefore represent (raw) pixel values.

As mentioned above, the encoding scheme used to generate the encoded representation (that is to be decoded in the manner described above) is advantageously a lossy encoding scheme, such that the encoded representation may not store data for all of the bits.

In particular, the encoding scheme used to generate the encoded representation is in an embodiment such that the encoding of a block of data elements involves truncating the bit sequence representations of the data values for the data elements within the block such that the data value for a data element in the block of data elements is represented using (only) a subset of one or more bits, e.g., and in an embodiment a subset of one or more most significant bits, of the respective bit sequence representation of the original data value (a 'truncated' data value), and only these subsets of bits, e.g., and in an embodiment corresponding to one or more most significant bits (the truncated data values), for the respective data elements are included into the encoded data packet.

The effect of this truncation is thus that one or more other bits, e.g., and in an embodiment one or more least significant bits, may be discarded during the encoding process, such that data indicative of those bits is not stored in the encoded representation.

(For the avoidance of doubt it will be understood that the most significant bit (singular) for a bit sequence is the highest bit position. The most significant bits (plural) are the bits closest to, and including, the most significant bit. For example, for a bit sequence containing N bits, with the Nth bit representing the highest value (the most significant bit), the most significant bits may then include the Nth bit, the N−1th bit, and so on.)

Thus, the encoding scheme in an embodiment encodes a block of data elements by truncating the bit sequences representing the data values for each of the data elements within the block of data elements to give corresponding 'truncated data values' for the data elements, the truncated data values including only a subset of one or more bits, e.g., and in an embodiment, one or more most significant, bits from the bit sequence representation of the original data values.

Truncating the bit sequences (i.e. data values) in this way may thus provide the desired compression of the data. However, naturally any information that was represented by the other, e.g., less significant, bits that were not included into the data packet is lost as a result of this truncation. The effect of this is that there is then less information that can be represented in the decoded output.

This may be the case, for example, when the block of data elements is being encoded in a 'raw' format into a fixed-size data packet. In that case, once the data packet is full, any remaining bits are effectively discarded. The encoding into a fixed size data packet is thus inherently lossy.

Thus, in embodiments, an array of data elements is divided (at least for encoding purposes) into a number of blocks of data elements that can be independently encoded/decoded and each block is allocated a certain bit budget (size) to guarantee that each block is encoded into a fixed-size data packet. The most significant bits for the data elements for each block are in an embodiment then encoded in their 'raw' form (by including the bit value into the data packet 'as is') starting with the highest bit values for each of the data elements (i.e. the most significant bit), and, so long as there is still space available in the data packet, after adding the highest bit values for each of the data elements, moving to the next highest bit values for the data elements, and so on, until the data packet is full (the allocated bit budget has been used).

As part of this encoding scheme, the order in which the bit values for the data elements are added into the data packet is in an embodiment varied, in an embodiment in a random fashion, e.g. such that the order in which the data elements are processed when adding the highest bit values into the data packet may be different to the order in which the data elements are processed when adding the next highest bit values into the data packet, and so on.

In an embodiment the order in which bits are added into the data packet is also varied between different blocks of data elements, e.g. in the overall array of data elements and/or in a sequence of such arrays. This may help avoid introducing repeating artefacts across the decoded output. For instance, if the data elements for all of the blocks within the overall array of data elements were always processed in the same order, a greater number of bits may be included into the data packet for the data elements that are processed first, and this may introduce a repeating pattern into the decoded output, e.g. based on the division of the array into blocks.

This means that the number of least significant bits that are discarded for the data value(s) associated with the data elements may vary across the array, such that different numbers of least significant bits may be discarded for different data elements, and for different data value(s) of data elements, within the array of data elements.

Thus, the encoding scheme according to the technology described herein in an embodiment stores as many most significant bits for the data elements in the block of data elements as possible within the allotted bit budget whilst still ensuring a fixed-size data packet for the block. However, depending on the desired (fixed) size for the data packet, i.e. the number of bits that have been allocated for the data packet, this may mean that only values for a subset of the bits for each data element within the block are included into the data packet (with bit values for one or more least (or less) significant bits not being included into the data packet).

In an embodiment, the encoding is performed according to the encoding techniques described in International Patent Application PCT/GB2019/053416 (WO 2020/115471) of Arm Limited, the content of which is incorporated herein in its entirety.

However, various other lossy encoding arrangements are possible and the encoding may be performed according to any suitable such encoding scheme, e.g. any suitable lossy encoding scheme in which some least significant bits are potentially discarded.

When it is desired to use one or more of the data values for a particular data element in an array of data elements that is stored in encoded form, the encoded representation of the array of data elements must therefore be decoded to determine a decoded data value (or group of data values) associated with the data element.

Because the encoding is such that (only) a subset of (e.g. most significant) bits are stored in the encoded representation (at least for some of the data elements), with the remaining (e.g. least significant) bits in an embodiment being discarded during the encoding, the initial representations of the data value(s) determined by the decoder may have one or more missing bits corresponding to bits that were discarded during the encoding.

Thus, as mentioned above, after an initial decoding has been performed to extract a set of initial representations of the data value(s) from the encoded representation of the data array, appropriate adjustment, e.g. rounding, is then applied in order to approximate the contribution to the data value(s) from any missing bits, e.g. corresponding to any bits that may have been discarded during the encoding and for which data was therefore not stored for the encoded representation.

The adjustment may be a rounding adjustment as described, e.g., in International Patent Application PCT/GB2019/053416 (WO 2020/115471). However, in general any suitable adjustment scheme can be used, and the adjustment may be more or less complex, as desired.

In the technology described herein the decoder is operable to select an adjustment scheme from a plurality of available adjustment schemes based on the 'patterns', e.g. numbers of, missing bits for the data value(s) associated with the data element that is being decoded. That is, rather than applying the same adjustment scheme for all data values to be decoded (for all data elements), the decoder of the technology described herein determines for a data element having one or more data values that are to be decoded which, if any, bits are missing from the data value(s) associated with the data element, and selects a adjustment scheme to be applied based on this determination.

To do this, the decoder in an embodiment determines, for each data value associated with a data element that is to be encoded, a count of how many bits are missing for the data value(s). For instance the decoder is in an embodiment able to determine from the encoded representation how many bits are stored for a given data value, and may also be able to determine (or it may be known, e.g. based on the data format) how many bits should be stored for that data value. In this way the decoder can determine the number of missing bits for the data value, e.g. by comparing the count of how many bits are actually stored for a given data value to the number of bits that should be stored for that data value.

Depending on the encoding scheme the decoder may also be able to determine the positions of the missing bits, e.g. where the encoding scheme is designed to encode from most significant bits downwards such that the least (or less) significant bits are preferentially discarded it can be determined (or it may be known) that any missing bits will correspond to the least significant bits (and this will typically, and in an embodiment, be the case).

The pattern of missing bits may thus be determined exactly. Or, in some cases, an estimate of the most likely pattern of missing bits may be used.

Various arrangements would be possible in this regard for determining the pattern of missing bits associated with the data value(s) for a data element.

The pattern of missing bits therefore in an embodiment relate to a number of missing bits for the data value in question. In embodiments, the pattern of missing bits is a pattern of missing bits for a group of data values associated with a single data element. That is the pattern of missing bits for a given data value associated with a data element may correspond to a number of missing bits for the data value in question, in an embodiment as well as a number of missing bits for any other data values in a group of data values associated with the same data element.

For example, for a data element with three associated data values, representing e.g. three different data (e.g. colour) channels, the pattern of missing bits may correspond to a pattern of 'X-Y-Z' missing bits, i.e. such that the first (colour) channel has X missing bits, the second (colour) channel has Y missing bits and the third (colour) channel has Z missing bits. Thus, the pattern is defined for the group of data values for the data element as a whole.

This means that the adjustment that is applied for a particular data value in a group of data values associated with a single data element is in an embodiment determined based not only on the missing bits associated with that data value but also the other data values in the group of data values.

The adjustment scheme that is to be applied for the data value(s) is then selected based on the determined pattern of missing bits.

For instance, in most cases, when a data element is to be decoded, the decoder may apply a standard adjustment scheme, involving applying a first set of respective adjustments to the data values associated with the data element. The standard adjustment scheme may involve any suitable adjustment, e.g. rounding, scheme, e.g. based on any suitable and desired heuristics.

However, when the decoder identifies certain patterns of missing bits, the decoder may instead apply a second, exceptional adjustment scheme, wherein a different adjustment from that which would be applied in the standard adjustment scheme is applied to at least one (but in an embodiment not all) of the data values associated with the data element.

Thus, there is in an embodiment a default adjustment scheme (which may itself comprise a number of different adjustments e.g. that the decoder may select between based on various other metrics), which will be applied for most of the data elements. However, when the decoder identifies certain patterns of missing bits, rather than applying the default adjustment scheme, the decoder applies a different adjustment scheme.

For instance, in embodiments, there may be a set of particular, in an embodiment selected, in an embodiment predetermined patterns of missing bits that have been found to introduce potentially problematic behaviour, e.g. of the type described above. In that case, when a particular data element is to be decoded by the decoder, the decoder may thus compare the pattern of missing bits identified for the data element to particular such in an embodiment selected, in an embodiment predetermined patterns of missing bits, and then select the adjustment scheme appropriately.

When the decoder identifies that a data element is associated with a potentially problematic pattern of missing bits, the decoder can then apply the exceptional adjustment scheme. On the other hand, for other patterns of missing bits, the decoder may apply its standard adjustment scheme, as normal.

For example, in an embodiment, the decoder checks the initial representations of the data values in the group of data values for the data element to see whether the encoding/decoding has resulted in a pattern of missing bits that has been (previously) identified as causing problematic behaviour over repeated cycles of encoding/decoding, as described above.

For example, for a given encoding/decoding scheme, there may be a number of predetermined patterns of missing bits that have been found to result in such problematic behaviour. The decoder is thus operable to check the pattern of missing bits for the initial representations of the data values in the group of data values for a data element to determine whether the pattern of missing bits matches one of the predetermined, problematic patterns of missing bits.

Each predetermined pattern of missing bits may also be associated with a corresponding adjustment scheme that is to be used for that pattern of missing bits. For instance, a suitable indication of the adjustment scheme that is to be used for a particular pattern of missing bits may be stored, e.g., in the form of a suitable look-up table. Or, in embodiments, the same exceptional adjustment scheme may be applied for any and all patterns of missing bits in the list.

The exceptional adjustment scheme that is applied, e.g., when such patterns of missing bits are identified, in an embodiment involves rounding at least one data value differently than it would otherwise be rounded, e.g. if the standard adjustment scheme were to be applied.

Where a data element is associated with a group of data values, the exceptional adjustment scheme may apply different adjustments for the different data values in the group. For instance, it may be the case that less than all (e.g. only one) of the data values in the group of data values is rounded differently (than it would otherwise be according to the decoder's standard adjustment scheme), and the other data values in the group of data values may be rounded as normal (in the same way they would be rounded when using the decoder's standard adjustment scheme). This may be the case for example where a pattern of missing bits for a group of data values has been found to lead to problematic behaviour for less than all of the data values in the group of data values, such that it is only those data value(s) that need to be rounded differently.

Various arrangements would be possible in this regard. However, in general the adjustment scheme (and adjustments) that are applied may include any suitable adjustments, e.g., that provide the desired behaviour. For example, once a certain type of problematic behaviour associated with a particular pattern of missing bits has been identified, the appropriate correction can then be determined.

In an embodiment, the exceptional scheme that is applied when such problematic patterns of missing bits are identified involves setting at least one (but in an embodiment not all) least significant missing bit to '0'. For example, it has been found in some cases that the problematic behaviour is only observed for one of the data values in the group of data values associated with the data element, and in particular occurs when the least significant bit for that data value is rounded to '1'. In that case, by forcing the least significant bit for the data value in which the problematic behaviour may otherwise occur to '0' the problematic behaviour can be avoided.

The other data values in the group of data values associated with the data element may however still be rounded as normal, e.g. according to the decoder's standard heuristics (whatever they may be). Thus, in the exceptional adjustment scheme in an embodiment some but not all of the least significant bits for the data values in the group of data values are set to zero.

Thus, in embodiments, when it is determined that the pattern of missing bits for a data element corresponds to a pattern of missing bits that has been (previously) found to result in problematic behaviour for one or more of the data values in the group of data values for the data element, the adjustment may be applied to set the least significant bits for the one or more data values for which the problematic behaviour has been observed to zero.

However, in other cases, it may be desirable to set all missing bits to zero, e.g. to simplify the decoding process.

Thus, in an embodiment, each data element in the array of data elements is associated with a respective group of data values, wherein each data value in the group of data values for a data element is in an embodiment defined (e.g. in a first, uncompressed data format, which is a format used by the encoder and need not correspond to the original data format in which the data values are used) by a respective sequence of bits.

In that case, the encoded representation of the array of data elements in an embodiment stores and represents data values defined in the first, uncompressed data format in a compressed form in which one or more least significant bits from the respective bit sequences for the data values associated with the data elements in the array of data elements may have been discarded such that data indicative of the bit values of the discarded bits is not stored in the encoded representation.

The method thus in an embodiment comprises: when it is desired to use the data values for a data element in an array of data elements that is stored in the encoded representation of the array of data elements: determining from the encoded representation of the array of data elements an initial sequence of bits for each data value in the group of data values for the data element, wherein the initially determined bit sequences represent the data values in the group of data values for the data element in the first, uncompressed data format but may have one or more missing bits corresponding to a respective one or more discarded bits for which data was not stored in the encoded representation.

The method in an embodiment further comprises: identifying from the initially determined bit sequences for the data values in the set of data values for the data element a pattern of missing bits for the group of data values associated with the data element; selecting based on the identified pattern of missing bits an adjustment (e.g. rounding) value (or values) to be applied for the data values in the group of data values for the data element; and applying the selected adjustment value(s) to the initially determined bit sequences for the data values in the group of data values for the data element to determine a set of adjusted data values representing the data element in the first, uncompressed data format.

Thus, the result of the adjustment is in an embodiment to produce a set of adjusted data values representing the data values in the group of data values for the data element in a first, uncompressed data format, i.e. the format in which they were encoded.

The data values in the first, uncompressed data format may then be output, e.g., as the data value for use by the data processing system. However, as mentioned above, in embodiments, the original data values are provided in a different data format, and are then transformed into the first, uncompressed data format for encoding.

The decoded data values may thus in embodiments be subject to various further desired processing steps in order to provide the decoded data values for use by the data processing system. For example, such further processing steps may include one or more (inverse) transforms in order to transform the data values from a first, uncompressed format (that was used for the encoding) into another data format suitable for use by the data processing system (i.e. the 'original' data format).

Various arrangements would be possible in this regard, e.g. as have been mentioned above.

For instance, in embodiments, one or more inverse transforms are applied to the adjusted data values in the first, uncompressed data format to transform the data values into the desired, original data format for use by the data processing system.

For example, to improve the encoding efficiency it may be desired to convert a spatial representation of the data into a frequency domain transform. To do this, a suitable frequency transform is applied during the encoding and a corresponding inverse frequency transform applied during the decoding.

As another example, the encoder may be designed to handle data in a first (e.g. YUV) data format. In that case, if the original data is provided and used in a different (e.g. RGB(A)) data format, the original data should be transformed into the first data format as part of the encoding process. To do this, a suitable colour transform is applied during the encoding and a corresponding inverse colour transform is then applied during the decoding.

Thus, in embodiments, the encoding scheme is designed to handle data provided in a certain data format (i.e. a first, uncompressed data format). For example, the encoding scheme may be designed to handle image data provided in (e.g.) a YUV colour format. Each data value in the group of data values for a data element may thus be defined in the first, uncompressed data format (e.g. YUV) by a respective sequence of bits.

This means that when the data is originally provided, and used by the data processing system, in a different format (e.g. a RGB(A) colour format), the encoding in an embodiment comprises a step of transforming the data from the original format into the first, uncompressed format. Correspondingly, the decoding in an embodiment involves one or more steps of (inverse) transforming the decoded data from the first, uncompressed data format (i.e. the format in which it was encoded) into a different, uncompressed data format (i.e. the original data format in which the data is used by the data processing system).

That is, the first, uncompressed format in which the data is encoded (and for which the encoded representation stores representative data) need not be, and in an embodiment is not, the original data format (i.e. the original data format in which the data is used by the data processing system).

In an embodiment, the array of data elements comprises an array of image data represented using an RGB(A) data format, but which is to be encoded in a YUV data format. Thus, the encoding in an embodiment comprises applying a colour transform to the original data in the RGB(A) data format to transform the data into the YUV format for encoding. Correspondingly, the decoding in an embodiment comprises applying an inverse colour transform to transform the decoded data in the YUV format back to the original RGB(A) format.

These transforms typically involve multiplying the data array by a suitable (inverse) colour transform matrix. Various arrangements would be possible in that regard.

In embodiments, there may be multiple possible colour transforms (e.g. different matrices) available to the encoder. The encoder may therefore be operable select which colour transform to use during the encoding, e.g. according to some suitable heuristic.

In this respect, the Applicants have now recognised that it may be beneficial to force the encoder to use the same transform matrices each time the same piece of data is encoded/decoded, particularly where the encoder would otherwise determine which transform matrix to use, e.g. based on its own encoding heuristics.

That is, when compressing the same piece of data multiple times, the Applicants have recognised it can be desirable to use the same transform matrix for each compression cycle.

More generally, the Applicants have recognised that where the encoder is operable make a selection between a number of different encoding parameters, the encoder should use the same encoding parameters each time the same piece of data is encoded/decoded in order to provide a more consistent encoding.

To achieve this, in embodiments, an encoding "hint" is provided to the encoder together with the data to be encoded, that indicates which encoding parameters should be used for encoding the data, e.g. based on which encoding parameters were used when the same data was previously encoded. The encoder can thus read the encoding hint appropriately to determine the encoding parameters to use. In this way the encoder's normal selection of the encoding parameters can be overridden, with the encoder being forced to use whatever encoding parameters are indicated in the encoding hint, rather than the encoder having to determine which encoding parameters should be used.

The encoding hint may, for example, be embedded into, or otherwise associated with, the decoded data during the decoding process so that when a piece of data that has been encoded/decoded is to be encoded again the encoder can determine from the encoding hint associated with the decoded data which parameters were used during the previous encoding and use the same encoding parameters.

For instance, the decoder in an embodiment has access to a set of associated metadata for the encoded representation, the associated metadata indicating one or more encoding parameters that were used to generate the encoded representation. The metadata for the encoded representation may be stored with the encoded representation itself, e.g. as header data. Or, the associated metadata may be provided to the decoder separately, e.g. as side channel information. Various arrangements would be possible in this regard.

The decoder is thus operable to determine from the associated metadata the encoding parameters that were used when the data was last encoded, and that in an embodiment should be used again by the encoder when the data is next encoded. The decoder can thus generate from the associated metadata an encoding hint which can then be suitably associated with the decoded data, and then provided to the encoder together with the decoded data when the decoded data is to be encoded again.

In this way, by adding such information to the decoded data during the decoding process, this then allows the encoding hint to be read by the encoder when the data is to be encoded again, and allows the encoder to override it's normal encoding heuristics and use the same encoding parameters as were previously used, to provide an improved encoding/decoding process over multiple cycles of encoding/decoding.

It is believed that generating and providing such encoding hints may be novel and advantageous in its own right.

A further embodiment of the technology described herein comprises a method of processing data using a decoder, the method comprising:
  decoding an encoded representation of an array of data elements to determine a set of decoded data representing the array of data elements in a first, uncompressed data format, wherein the decoding is performed using associated metadata for the encoded representation, the associated metadata indicating one or more encoding parameters that were used to generate the encoded representation;
  the decoder determining from the associated metadata for the encoded representation the one or more encoding parameters that were used to generate the encoded representation and generating therefrom an encoding "hint" comprising an indication of the one or more encoding parameters that were used to generate the encoded representation; and
  the decoder associating the encoding hint with the set of decoded data in such a manner that the one or more encoding parameters indicated by the encoding hint can be determined when the decoded data is subsequently to be encoded.

A yet further embodiment of the technology described herein comprises a decoder, the decoder comprising:
  a decoding circuit configured to decode an encoded representation of an array of data elements to determine a set of decoded data representing the array of data elements in a first, uncompressed data format, wherein the decoding is performed using associated metadata for the encoded representation, the associated metadata indicating one or more encoding parameters that were used to generate the encoded representation;
  the decoding circuit further configured to determine from the associated metadata for the encoded representation the one or more encoding parameters that were used to generate the encoded representation and to generate therefrom an encoding "hint" comprising an indication of the one or more encoding parameters that were used to generate the encoded representation;
  the decoder further comprising an output circuit configured to output decoded data and to associate the encoding hint with the set of decoded data in such a manner that the one or more encoding parameters indicated by the encoding hint can be determined when the decoded data is subsequently to be encoded.

The encoding/decoding according to these further embodiments is in an embodiment performed in accordance with the first and second embodiments described above.

For example, in embodiments, the encoding/decoding is performed according to the lossy methods described in International Patent Application Publication Number WO 2020/115471 (PCT/GB2019/053416) of Arm Limited. Other arrangements would however be possible and in general any suitable encoding/decoding scheme may be used in combination with these further embodiments.

Similarly, the array of data elements that is being processed in these further embodiments may generally be any suitable array of data elements, e.g. including any array of data elements as described above. For example, the array of data elements in an embodiment comprises an array of image data.

According to these further embodiments of the technology described herein, once the decoded (e.g. image) data has been produced, an encoding "hint" is then associated with the decoded data, as discussed above.

In an embodiment this is done by storing the encoding hint in the decoded data itself. Thus, in embodiments, the encoding hint may be stored using a subset of the data elements in the decoded data array. For example, where the data array comprises an image, and the data elements correspond to individual pixels, a certain number of pixels may be used to store the encoding hint.

In an embodiment the encoding hint is stored in the decoded data in such a manner that the presence of the encoding hint is not readily perceptible (e.g. to users, when the decoded data is displayed).

For instance, in embodiments, relatively few data elements are used for storing the encoding hint, and in some embodiments the data elements that are used for storing the encoding hint are spaced apart from each other, and/or positioned away from expected areas of interest (e.g. positioned away from the center of the image).

Similarly, the encoding hint is in an embodiment stored using a set of the least significant bits (or less significant bits) of the data elements in the array. For example, embodiments may use four, eight, etc., least significant bits from different data elements (e.g. pixels) to store the different encoding hints.

In this way the encoding hint can be added to the decoded data without significantly reducing the perceived quality of the (e.g.) image.

However, in embodiments, any suitable portions of the data elements may be used to store the encoding hint, as desired.

In general the size of the encoding hint, e.g. the number of bits that are used to store the encoding hint, should be selected to provide a balance between maintaining data fidelity and ensuring that the encoding hint is sufficiently unique to reduce occurrences of the encoder falsely detecting an encoding hint (where one is not provided).

For instance, the encoder will generally not know whether a given piece of data is associated with an encoding hint. To avoid false determinations the bit sequence that is used to store the encoding hint is therefore in an embodiment also chosen such that it is unlikely to occur naturally. For instance, the encoding hint should not be (and in an embodiment is not) represented using common data values (e.g. zero).

As mentioned above, the encoding hint is in an embodiment stored using a sequence of 'N' in an embodiment least significant bits associated with a corresponding N data elements that are distributed within the data array. The encoder may have to make a selection between a number of different sets of encoding parameters, and each different set of encoding parameters is therefore in an embodiment associated with a unique encoding hint.

In an embodiment the encoding hints are stored using a number of bits that is greater than the minimum number of bits that would be needed to store the different encoding hints. For instance, where there are eight different encoding hints that may need to be stored (corresponding to eight different sets of encoding parameters), the set of encoding hints could minimally be represented using N=3 bits. However, in embodiments, rather than using the minimum number of bits (i.e. 3), a greater number of bits are used. For example, the eight different encoding hints could be represented using 8 bits. In this way it is again possible to reduce the likelihood of the encoding hint occurring naturally. For instance, with 8 bits, there are 256 possible values that could be represented, but only 8 of these 256 possible values correspond to an encoding hint.

When decoded data that includes such encoding hints is subsequently provided to an encoder, to be encoded again, the encoder is thus operable to read the encoding hint to identify the one or more encoding parameters that were used when the data was previously encoded, and to then use the same encoding parameters. On the other hand, if the encoder can't recognise encoding hint (or no encoding hint is provided) the encoding is performed according to encoder's normal encoding heuristics.

For example, in an embodiment, the encoding hint may indicate which transform matrix, of a plurality of possible transform matrices, was used during the encoding. Thus, there may be, e.g., eight possible transform matrices, and a corresponding eight different encoding hints may need to be generated. The encoder is thus able to determine from the encoding hint (e.g. using a suitable look-up table) which transform matrix should be used when encoding the data, and accordingly to use the indicated transform matrix. However, in general the encoding hint may be used to store any suitable information about the encoding parameters, as desired, that may be used by the encoder.

In general, the decoder is operable to decode the data stream to recover the original source data (e.g. image) that was encoded, and then use (e.g. display) this data as desired. Thus, once the data stream has been decoded, the decoder may then be configured to display, or output for display, the decoded data.

The encoding and decoding apparatuses discussed above may generally be provided as part of a data processing system. For example, the apparatuses may comprise part of an image and/or video processing system that includes a camera, such as a digital camera, mobile phone or tablet.

In general, the processes described herein in any embodiment may be performed by any desired and suitable apparatus. For example, the processes described herein in any embodiment may be performed by an image or video processor (codec). The data processing apparatus described herein in any embodiment may therefore comprise or may be a video processor. Thus, the processing (encoding/decoding) circuits/circuitry, output circuits/circuitry, header generating circuits/circuitry, header reading circuits/circuitry or input circuits/circuitry, etc. described herein in any embodiment may form part of a video processor. The data processing apparatus described herein in any embodiment may comprise, or may be, or may form part of, a system on chip (SoC).

As will be appreciated by those skilled in the art, the encoding/decoding apparatus of the technology described herein described herein may be part of an overall data processing system that includes, for example, a host (e.g. central) processor. The host processor may, for example, execute applications that require data processing by the encoding/decoding apparatus. The host processor may send appropriate commands and data to the encoding/decoding apparatus to control it to perform the data encoding/decoding operations and to generate and/or use an output required by applications executing on the host processor. To facilitate this, the host processor may execute a driver for the encoding/decoding apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a camera that generates the arrays of data elements.

The memory referred to herein may be any desired and suitable memory of or for the data processing apparatus. The memory may be external to the data processing apparatus, e.g. video processor and/or system on chip (SoC). The memory may be, for example, main system memory.

The technology described herein described herein can be used for all forms of data arrays that a data processing apparatus may provide and/or use, such as images or frames for display. Thus, as indicated above, the arrays of data elements may comprise image data and/or may correspond to images or frames of image data.

In an embodiment, the various functions of the technology described herein described herein are carried out on a single data (e.g. image) processing platform that provides and/or uses the arrays of data elements.

The technology described herein described herein can be implemented in any suitable system, such as a suitably configured computer or micro-processor based system. In an embodiment, the technology described herein described herein is implemented in a computer and/or micro-processor based system.

The various functions of the technology described herein described herein can be carried out in any desired and suitable manner. For example, the steps and functions of the technology described herein described herein can be implemented in hardware or software, as desired. Thus, for example, unless otherwise indicated, the various circuits/circuitry, functional elements, and stages, of the technology described herein described herein may comprise a suitable processor or processors, controller or controllers, functional units, circuits/circuitry, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

In particular, it is contemplated that the encoder may be implemented either in hardware or software, as desired. Thus, for example, the encoder may comprise a suitable processor or processors, controller or controllers, functional units, (encoding) circuits/circuitry, processing logic, microprocessor arrangements, etc., that are operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

Similarly, the decoder can be implemented in hardware or software, as desired. Thus, for example, the decoder may comprise a suitable processor or processors, controller or controllers, functional units, (decoding) circuits/circuitry, processing logic, microprocessor arrangements, etc., that are operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

The various steps or functions, etc., of the technology described herein described herein may be duplicated and/or carried out in parallel on a given processor. Equally, the various processing stages may share processing circuits/circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein described herein can, and in an embodiment do, include, as appropriate, any one or more or all of the features described herein.

The methods in accordance with the technology described herein described herein may be implemented at least partially using software e.g. computer programs. Thus, further embodiments the technology described herein described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein described herein also extends to a computer software carrier comprising such software which when used to operate a data processing apparatus or system comprising a data processor causes in conjunction with said data processor said apparatus or system to carry out the steps of the methods of the technology described herein described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein described herein need be carried out by computer software and thus in further embodiments comprise computer software and such software installed on a computer software carrier for carrying out at least one of the steps of the methods set out herein.

The technology described herein described herein may accordingly suitably be embodied as a computer program product for use with a computer system. Such an implementation may comprise a series of computer readable instructions either fixed on a tangible, non-transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology described herein, present or future, including but not limited to, semiconductor, magnetic, or optical, or transmitted using any communications technology described herein, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

The drawings show elements of data processing apparatuses and systems that are relevant to embodiments of the technology described herein described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings (or, conversely, where elements are shown as sharing significant hardware circuits, these may in practice comprise separate elements).

FIG. 1 shows schematically an embodiment of a data processing system 100 that can provide and use data arrays, such as images or video frames for display, that have been encoded in the manner of the technology described herein. It will be appreciated that FIG. 1 merely shows one example of a system that is suitable for use with the technology described herein, and that various other arrangements are possible.

In this embodiment, the system 100 comprises a data processing apparatus in the form of a system on chip (SoC) 102. The system 100 also comprises off-chip (main) memory 116, a display device 118 and a video camera 120.

The SoC 102 comprises a central processing unit (CPU) 104, a graphics processing unit (GPU) 106, an image/video processor 108, a display controller 110, an interconnect 112 and a memory controller 114.

As is shown in FIG. 1, the CPU 104, GPU 106, image/video processor 108, and display controller 110 communicate with each other via the interconnect 112 and with the memory 116 via the interconnect 112 and memory controller 114. The display controller 110 also communicates with the display device 118. The video camera 120 also communicates with the image/video processor 108 on the SoC 102 via the interconnect 112.

In embodiments, the image/video processor 108 reads in image data from memory 116, encodes the image data (e.g. in the manner of the technology described herein) using a suitable encoder circuit 122, and then outputs that encoded image data, e.g. for storage in memory 116 or for streaming to another device. The encoded image data can later be retrieved and decoded, e.g. by a suitable decoder circuit 124 of the image/video processor 108, or received and decoded by another device. Although the image/video processor 108 is shown as having a separate encoder circuit 122 and decoder circuit 124 it will be appreciated that this is merely schematic and that these may form part of a common encoding/decoding circuit. The decoded image data can then be output, e.g. by the display controller 110 to the display device 118 or by another device, for display.

Thus, within such data processing systems it may be desired at various points to be able to compress the image data that is being processed. Furthermore, in order to be able to facilitate higher throughput, e.g. for higher bandwidth media applications, it may be desirable to be able to guarantee a given bandwidth (bit rate).

In the present embodiment an encoding scheme as described in International Patent Application PCT/GB2019/053416 (WO 2020/115471) is used that is capable of encoding the image data into a data packet having a fixed size, and thus guaranteeing a desired bit rate, is used. The encoding scheme is a block-based scheme.

Each of the data elements (e.g. sampling positions, or pixels, within the image) in the block is associated with a respective group of plural data values (e.g. representing a set of colour values for the sampling position, or pixel, in question).

The encoding scheme in the present embodiments involves applying a spatial to frequency transform, such as a discrete cosine transform (DCT), or similar, to the block to generate a corresponding block of signed frequency transformed coefficients. The block of frequency transformed coefficients is then encoded into a fixed size data packet using bit plane based entropy coding.

In the present embodiment the image data is used by the data processing system in an RGB(A) colour format. However, the encoding scheme is designed to encode data that is provided in a YUV colour format. The encoding scheme thus further involves applying a colour transform to the block to convert the original RGB(A) colour values into the YUV colour format for encoding.

Figure 2:
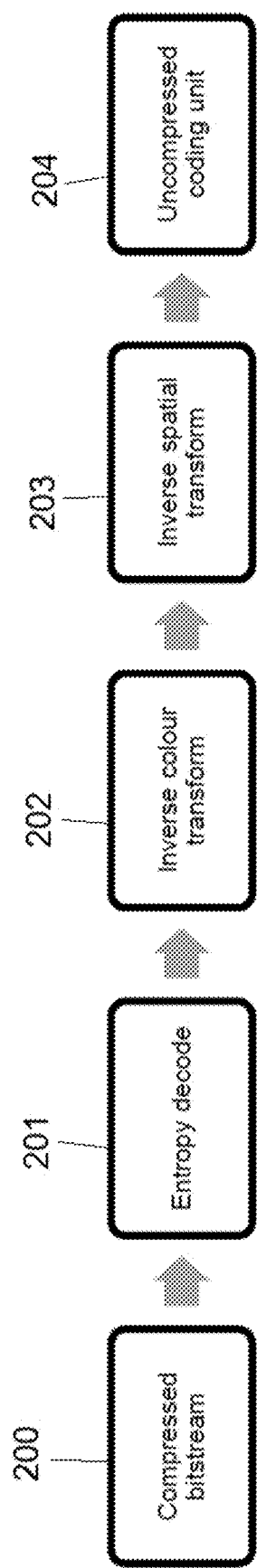
FIG. 2 shows schematically a decoder operation within which embodiments of the technology described herein may be implemented.

FIG. 2 shows a corresponding decoding process. The decoding process is in effect the reverse of the encoding process described above.

Thus, as shown in FIG. 2, when the data processor needs to use the data values for a data element, the decoder is operable to read the compressed bitstream (step 200) and perform an initial step of entropy decoding (step 201) in order to determine from the compressed representation of the data values an initial decoded representation of the data values in a first, uncompressed data format (which in the present embodiments is a YUV colour format).

The initial decoded representation of the data value in the first, uncompressed data format is then subject to an inverse colour transform to convert the data values in the YUV colour format into the desired RGB(A) colour format (step 202), and an inverse spatial transform (step 203) to convert the data values from the frequency domain back into the desired spatial distribution.

The output of this decoding (step 204) is thus an uncompressed coding unit (i.e. a block of decoded data) in a suitable format that can then be used by the data processing system.

In the present embodiment, when encoding a block of image data, at least some of the image data is encoded using a 'raw' encoding scheme wherein the most significant bits representing the data values for the different sampling points within the image are added into the data packet 'as is' until the data packet is full.

This 'raw' encoding scheme thus adds as many most significant bits as possible for the data elements until the desired data packet size is reached. However, depending on the desired size of the data packet, this may have the effect that at least some of the data values are truncated.

For example, in a typical example, one or two least significant bits may be discarded for each data value.

Correspondingly, this means that when the compressed bitstream is subsequently decoded, the initial decoded data values determined by the entropy decoding (step 201) may have one or more "missing" bits, corresponding to those least significant bits that were discarded during the encoding process.

Figure 3:
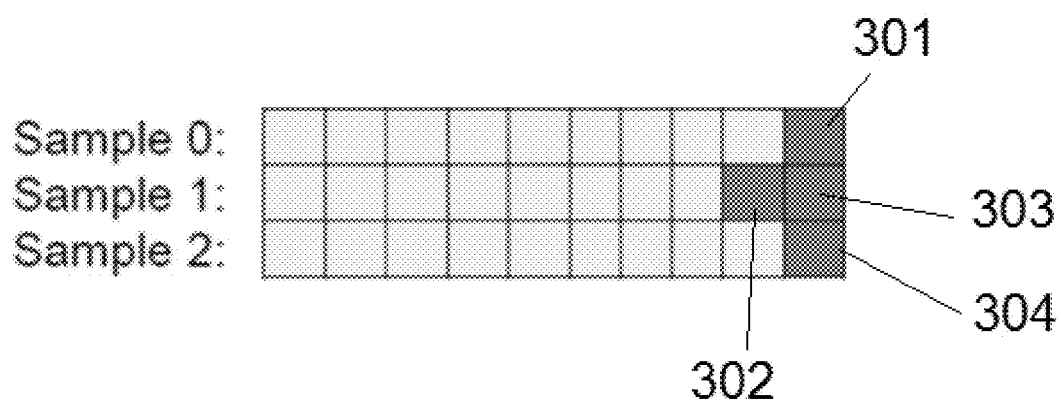
FIG. 3 shows an example of an output pixel from the initial entropy decoding step in the decoder operation of FIG. 2.

FIG. 3 shows an example of an output pixel from the initial entropy decoding step in the decoder operation of FIG. 2. As shown, the pixel is associated with three data values (Samples 0, 1, 2) corresponding to the YUV colour channels. In this example, each data value at this stage has one or more missing least significant bits (i.e. is 'quantised'). In particular, the first colour channel (the Y channel) has a single missing bit 301, the second colour channel (the U channel) has two missing bits 302, 303 and the third colour channel (the V channel) has a single missing bit 304.

In order to approximate the contribution of these missing bits various suitable rounding adjustments may be applied to the initial decoded data values, e.g. to fill in any missing bits. Various suitable rounding schemes may be applied to try to provide a better approximation of the original data values.

The present Applicants have however recognised that certain patterns of missing bits can introduce problematic behaviour when such rounding is applied, depending on the rounding scheme. In particular, the present Applicants have found that when the same piece of data is encoded/decoded multiple times, there are certain patterns of missing bits that can result in the data values for at least some of the colour channels continuing to grow with each cycle of encoding/decoding, such that the image quality degrades with each cycle of encoding/decoding.

This may be a result, for example, of the interplay between the rounding scheme and the inverse colour transform that is applied during the decoding process.

In the present embodiments, the decoder is thus operable to identify such instances of potentially problematic patterns of missing bits, and when a data element has a pattern of missing bits that has been found to cause such problematic behaviour, the decoder applies a different rounding scheme to that which it would otherwise, normally use.

Thus, the decoder of the present embodiments inspects the pattern of missing bits for a data element and determines whether this is a pattern of bits that has been (previously) determined to give rise to problematic behaviour when repeatedly encoding/decoding that data element, and in that case handle the data element exceptionally, e.g., and in an embodiment by applying a different rounding scheme than the decoder would otherwise.

That is, in normal operation, and for any data elements that do not contain the patterns of missing bits that have been determined to cause such problematic behaviour (or data elements for which there are no missing bits, i.e. the pattern is a 'null' pattern), the decoder applies a first, "standard" rounding scheme (e.g. a rounding scheme as described in International Patent Application Publication Number WO 2020/115471 (PCT/GB2019/053416), the content of which is incorporated herein in its entirety).

However, when the decoder identifies that a data element contains a problematic pattern of missing bits, the decoder instead exceptionally applies a second, different rounding scheme.

The patterns of missing bits that lead to this behaviour will generally depend on the encoding/rounding scheme in question. Thus, whilst various examples of problematic patterns of missing bits for the present encoding scheme are described in the Tables below, together with the appropriate rounding adjustments, depending on the encoding/rounding scheme in question there may be further problematic patterns of missing bits. However, these can be determined in advance for a particular encoding/rounding scheme, and then stored such that the decoder is able to identify such occurrences and apply the exceptional rounding scheme accordingly.

Figure 4:
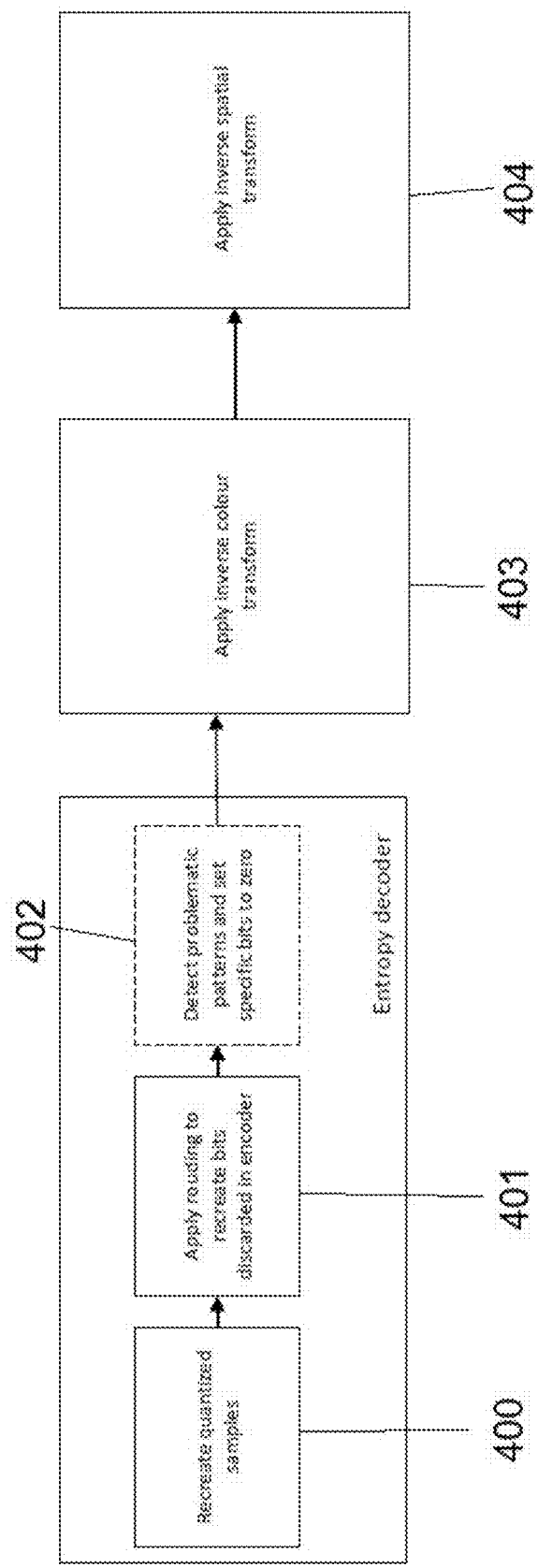
FIG. 4 shows in more detail the decoder operation according to an embodiment of the technology described herein.

FIG. 4 thus shows an example of the decoding process according to the present embodiment. As shown in FIG. 4, after the quantised samples are recreated (step 400) by the initial entropy decoding, which quantised samples potentially have one or more missing bits, appropriate rounding adjustments are then applied (step 401) to recreate any missing bits. For most data elements, the entropy decoder uses its "standard" rounding scheme, e.g. wherein the rounding heuristics are selected to provide the expected optimal image quality. However, when the entropy decoder detects problematic patterns of missing bits (step 402), a different rounding scheme is applied.

In particular, in this example, when a problematic pattern of missing bits is identified, rather than applying the standard rounding scheme, a different rounding adjustment is used in which specific bits are (always) set to '0'.

Thus, in the present embodiment, after the initial entropy decoding, before applying any rounding to fill in any missing bits (that were discarded during the encoding, and therefore for which indicative data was not stored), the pattern of missing bits is inspected to check whether the pattern of missing bits is a pattern that has been found to lead to this problematic behaviour.

Such cases are then handled exceptionally. That is, rather than applying the rounding scheme (which may be a fixed rounding scheme, or may be selected by the decoder), at least some of the missing bits are set to zero (i.e. a 'zero' rounding scheme is applied).

The decoding then continues as normal, e.g. by applying the desired inverse colour transform (step 403) and inverse spatial transform (step 404) to convert the data values into the desired data format for use by the data processing system.

By way of example, Table 1 illustrates the numbers of missing bits that may lead to problematic behaviour for the first colour channel (e.g. the Y channel).

TABLE 1

|  | Sample 0 | Sample 1 | Sample 2 |
| --- | --- | --- | --- |
| Pattern 1 | 1 | 2 | X |

In this case, the colour channel represented by Sample 0 (e.g. the Y channel) experiences problematic behaviour when there is 1 missing bit in that channel, 2 missing bits in the second (e.g. U) channel and any number of missing bits in the third (e.g. V) channel.

In particular, in this example, if the missing bit for Sample 0 (the Y channel) were to be rounded to '1' (e.g.) based on the standard rounding scheme, the Y value may continue to grow with each cycle of encoding/decoding.

Thus, when this pattern of missing bits is identified, rather than applying the standard rounding scheme, the decoder should (and in the present embodiment does) always set the least significant bit for Sample 0 (the Y channel) to '0'. The other samples (Samples 1 and 2) may however still be rounded as normal, since the problematic behaviour is only exhibited for Sample 0 (the Y channel).

As another example, Table 2 illustrates the numbers of missing bits in problematic patterns for the second (e.g. U) colour channel (Sample 1). In this case, the least significant bit for Sample 1 (the U channel) should be (and is) always set to '0' to prevent the problematic behaviour from occurring. Again, the other samples (the Y and V channels) may be rounded as normal.

TABLE 2

|           | Sample 0 | Sample 1 | Sample 2 |
|-----------|----------|----------|----------|
| Pattern 1 | 1        | 1        | 2        |
| Pattern 2 | 1        | 2        | 1        |
| Pattern 3 | 1        | 2        | 2        |

It will be appreciated that these specific examples are provided for illustrative purposes only and that depending on, e.g., the encoding/decoding scheme, there may be various other problematic patterns of missing bits that can be handled in a similar fashion. For instance, once a problematic pattern of missing bits has been identified for a particular encoding/decoding scheme, an appropriate exceptional rounding scheme can be identified.

In this way, by selecting the adjustment scheme that is to be applied based on the patterns of missing bits resulting from the initial entropy decoding, the present embodiment is able to provide an improved stable encoding/decoding process, e.g. that is stable over repeated cycles of encoding/decoding.

Another source of potentially problematic behaviour when repeatedly encoding/decoding the same piece of data is when the encoder has to make a selection of which encoding parameters to use. In that case, where the encoder has multiple available encoding schemes, and has to make a selection between different encoding parameters, it may be desirable to force the encoder to use the same parameters when encoding the same piece of data in order to provide a more consistent encoding (as this may not be the case).

In the present embodiment, an encoding 'hint' is therefore included into the decoded image data indicating which encoding parameters the encoder should use the next time that data is encoded. This information can be embedded into the image data itself, e.g. by setting the values of the least significant bits of certain pixels accordingly to store this information.

The encoding hint may be generated and added to the decoded data during the decoding process.

Figure 5:
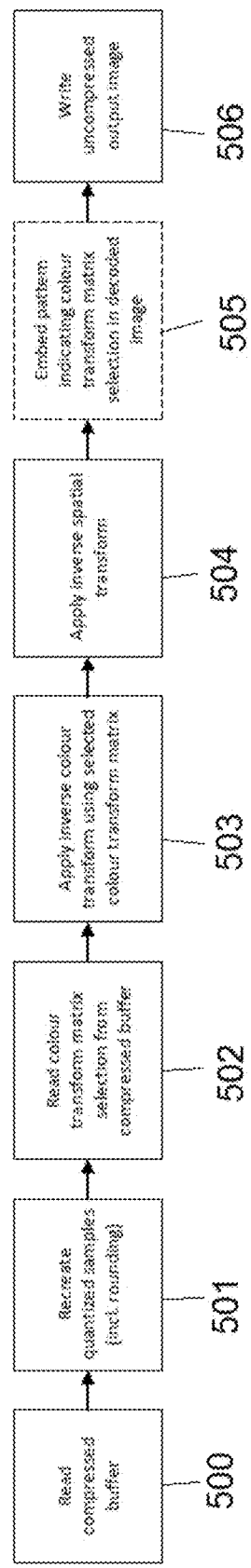
FIG. 5 shows the decoder operation according to another embodiment of the technology described herein.

FIG. 5 thus shows a decoding flow according to another embodiment.

The decoding process starts by reading the compressed data (step 500), and then performing the initial entropy decoding, including any rounding (step 501), as described above.

The decoder then reads the compression metadata associated with the compressed data (step 502) to determine which colour transform matrix was used during the encoding. The decoder then applies the appropriate inverse colour transform matrix (step 503), and inverse spatial transform (step 504), in a similar manner as described above, to determine the decoded data values.

However, rather than outputting the decoded image at this stage, as in the previous embodiments, the decoder embeds into the decoded image data an encoding hint indicating which colour transform matrix was used (step 505). The decoded image including the embedded encoding hint is then written out for use by the data processing system (step 506).

When the image is to be encoded again, the encoder is thus able to read the embedded encoding hint, and use this to determine which colour transform matrix to use.

Figure 6:
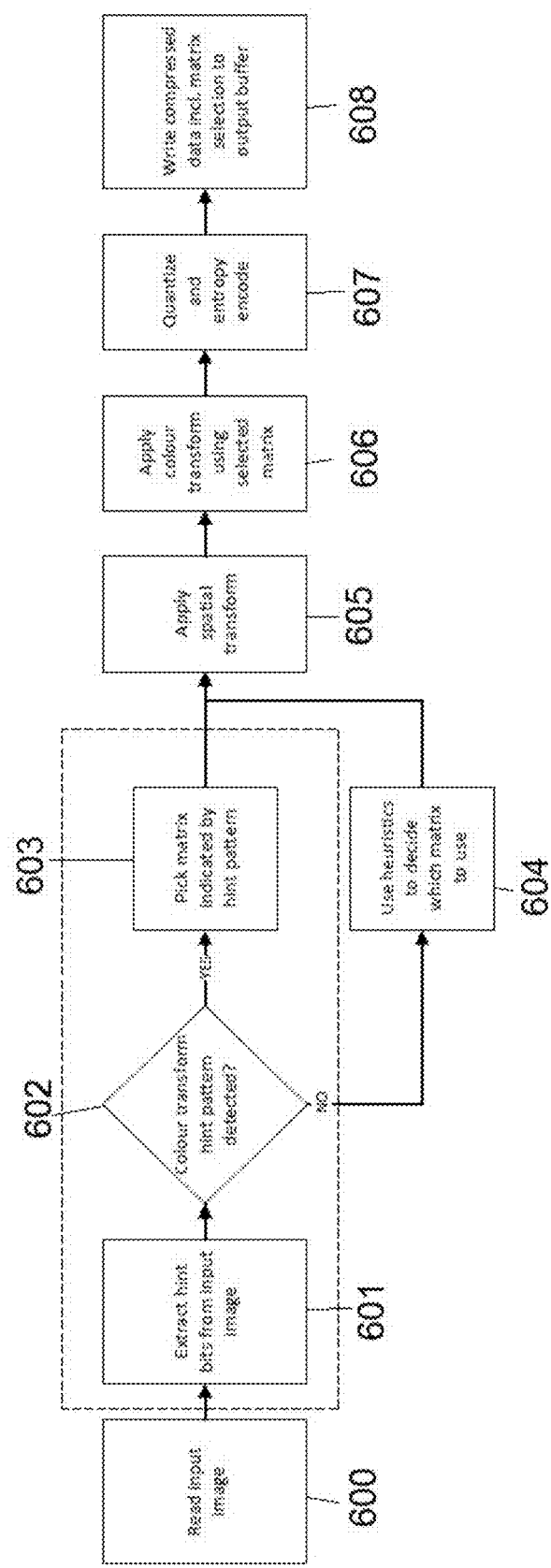
FIG. 6 shows the corresponding encoder operation for the embodiment shown in FIG. 5.

The encoding flow is shown in FIG. 6. The input image is read (step 600), and the encoder then extracts from the input image the bit values for the encoding hint (step 601). When the encoder is able to identify an encoding hint (step 602—Yes), the encoder selects the indicated colour transform matrix (step 603) for use.

Otherwise, if the encoder cannot identify an encoding hint (step 602—No) the encoder uses its standard heuristics to decide which colour transform matrix to use (step 604).

The encoding then proceeds as normal, with the encoding applying a suitable spatial transform matrix (step 605), followed by a colour transform using the selected matrix (step 606). The transformed data values are then quantised and entropy coded (step 607) and the compressed data is then written into a compressed output buffer (step 608), along with metadata indicating which colour transform matrix was used.

In the present embodiment the encoding hint is stored using data elements in the image data itself. For instance, the least significant bits of a certain set of pixels within the image may be used to store a value for the encoding hint. The encoder can then read the least significant bits for those pixels and compare the value with a list of corresponding values associated with encoding hints. When the encoder identifies an encoding hint, it can then apply the colour transform matrix associated with that encoding hint.

For example, there may be eight different colour transform matrices, and a corresponding eight different values for encoding hints. When one of these eight values is detected, the encoder uses the corresponding colour transform matrix.

On the other hand, if the bit values do not correspond to one of the eight encoding hints, the encoder determines which colour transform matrix to use in its normal manner.

Figure 7:
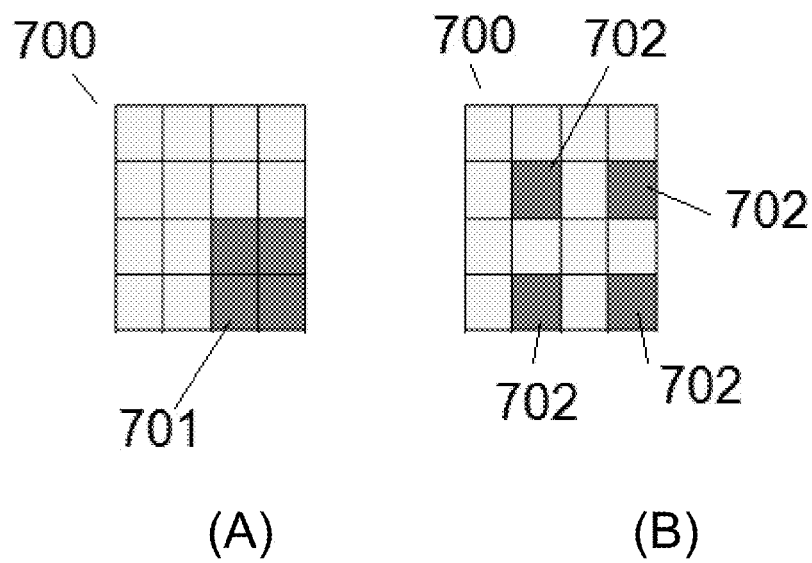
FIG. 7 illustrates how an encoding hint may be stored within an array of data elements according to an embodiment of the technology described herein.

An example of how an encoding hint may be stored within an array of image data is shown in FIG. 7.

FIG. 7A shows an example of a block of image data 700 wherein a subset 701 of data elements (e.g. pixels) are used for storing an encoding hint. In particular, the least significant bits for the four pixels 701 are used for storing the value of the encoding hint.

FIG. 7B shows another example of a block of image data 700 wherein a different subset of data elements 702 are used for storing the encoding hint. In FIG. 7B the pixels that are used for storing the encoding hint are distributed within the block of image data 700 in a different pattern to that used in FIG. 7A. Spacing the pixels that are used for storing the encoding hint further apart as in FIG. 7B may help reduce the user's perception of the encoding hint in the image data. However, any suitable pattern or distribution of pixels may be used for storing the encoding hint.

In general, any suitable subset of data elements may be used for storing the encoding hint. However, the number of pixels used for storing the encoding hint should be relatively few to maintain image fidelity. The positions of the pixels that are used may also be selected to be away from the expected areas of interest in the image.

The values used for representing the encoding hints are also selected to avoid common values (such as '0'), e.g. to prevent the encoder falsely detecting an encoding hint where one has not been added.

Further, the eight different encoding hints are in the present embodiment represented as 8-bit values (using 8 least significant bits distributed across the image data). It will be appreciated that it would be possible to use only 3 bits to represent the eight different encoding hints. However, using a greater number of bits reduces the likelihood of the 8-bit values that are used to represent the encoding hints occurring naturally in the image data, and therefore causing the encoder to falsely detect the presence of an encoding hint where one is not present.

The foregoing detailed description has been presented for the purposes of illustration and description. It is not intended to be exhaustive or to limit the technology described herein described herein to the precise form disclosed. Many modifications and variations are possible in the light of the above teaching. The described embodiments were chosen in order to best explain the principles of the technology described herein described herein and its practical applications, to thereby enable others skilled in the art to best utilise the technology described herein described herein, in various embodiments and with various modifications as are suited to the particular use contemplated. It is intended that the scope be defined by the claims appended hereto.

The invention claimed is:

1. A method for determining data values for a data element of an array of data elements from an encoded representation of the array of data elements,
   wherein each data element in the array of data elements is associated with a respective one or more data values, each data value represented by a respective bit sequence,
   wherein the encoded representation of the array of data elements represents the data value(s) for at least some of the data elements in the array of data elements using a subset of one or more bits of the respective bit sequences for the data value(s) such that, for those data elements, data indicative of the bit values for one or more other bits of the respective bit sequences for the data value(s) is not stored in the encoded representation;
   the method comprising:
   decoding the encoded representation of the array of data elements to determine an initial sequence of bits representing the data value(s) for the data element, wherein the initially determined bit sequences for the data value(s) for the data element may have one or more missing bits corresponding to a respective one or more bits for which data was not stored in the encoded representation;
   determining which, if any, bits are missing for the data value(s) for the data element;
   selecting, in dependence on the determination of which, if any, bits are missing for the data value(s) for the data element, an adjustment scheme to be applied for the data value(s) for the data element from a plurality of available adjustment schemes; and
   applying the selected adjustment scheme to the data value(s) for the data element to obtain decoded data value(s) for the data element.

2. The method of claim 1, wherein each data element in the array of data elements is associated with a respective group of data values, wherein each data value in the group of data values for a data element is defined in a first, uncompressed data format by a respective sequence of bits, the method comprising:
   when it is desired to use the data values for a data element in an array of data elements that is stored in the encoded representation of the array of data elements:
   determining from the encoded representation of the array of data elements an initial sequence of bits for each data value in the group of data values for the data element, wherein the initially determined bit sequences represent the data values in the group of data values for the data element in the first, uncompressed data format but may have one or more missing bits corresponding to a respective one or more discarded bits for which data was not stored in the encoded representation;
   identifying from the initially determined bit sequences for the data values in the set of data values for the data element a pattern of missing bits for the group of data values associated with the data element; and
   selecting the adjustment scheme based on the identified pattern of missing bits.

3. The method of claim 2, wherein selecting the adjustment scheme based on the identified pattern of missing bits comprises comparing the identified pattern of missing bits with one or more predetermined patterns of bits that have been found to lead to a problematic behaviour for at least one of the data values.

4. The method of claim 3, wherein when such a pattern of missing bits is identified, the selected adjustment scheme comprises setting one or more least significant bits for the at least one of the data values to zero.

5. The method of claim 1, wherein the array of data elements is an array of image data, and wherein the one or more data value(s) associated with each data element comprise a respective set of one or more colour value(s).

6. The method of claim 1, comprising transforming the decoded data value(s) from a first, uncompressed data format into a second, uncompressed data format for use by a data processing system.

7. The method of claim 6, wherein transforming the decoded data value(s) from the first, uncompressed data format into the second, uncompressed data format comprises an inverse colour transform.

8. The method of claim 1, wherein the decoding is performed using associated metadata for the encoded representation, the associated metadata indicating one or more encoding parameters that were used to generate the encoded representation, the method further comprising associating with the decoded data value(s) an encoding hint comprising an indication of the one or more encoding parameters that were used to generate the encoded representation.

9. A method of processing data using a decoder, the method comprising:
   decoding an encoded representation of an array of data elements to determine a set of decoded data representing the array of data elements in a first, uncompressed data format, wherein the decoding is performed using associated metadata for the encoded representation, the associated metadata indicating one or more encoding parameters that were used to generate the encoded representation;
   the decoder determining from the associated metadata for the encoded representation the one or more encoding parameters that were used to generate the encoded representation and generating therefrom an encoding hint comprising an indication of the one or more encoding parameters that were used to generate the encoded representation; and
   the decoder associating the encoding hint with the set of decoded data in such a manner that the one or more encoding parameters indicated by the encoding hint can be determined when the decoded data is subsequently to be encoded.

10. The method of claim 9, wherein associating the encoding hint with the set of decoded data comprises storing the encoding hint in the array of data elements using a set of respective bits from different data elements in the array.

11. A decoder for determining data values for a data element of an array of data elements from an encoded representation of the array of data elements,
wherein each data element in the array of data elements is associated with a respective one or more data values each data value represented by a respective bit sequence,
wherein the encoded representation of the array of data elements represents the data value(s) for at least some of the data elements in the array of data elements using a subset of one or more bits of the respective bit sequences for the data value(s) such that for those data elements data indicative of the bit values for one or more other bits of the respective bit sequences for the data value(s) is not stored in the encoded representation;
the decoder comprising:
a decoding circuit configured to:
decode the encoded representation of the array of data elements to determine an initial sequence of bits representing the data value(s) for the data element, wherein the initially determined bit sequences for the data value(s) for the data element may have one or more missing bits corresponding to a respective one or more bits for which data was not stored in the encoded representation;
a rounding circuit configured to:
determine which bits are missing for the data value(s) for the data element;
select, in dependence on the determination of which bits are missing for the data value(s) for the data element, an adjustment scheme to be applied for the data value(s) for the data element from a plurality of available adjustment schemes; and
apply the selected adjustment scheme to the data value(s) for the data element to obtain decoded data value(s) for the data element.

12. The decoder of claim 11, wherein each data element in the array of data elements is associated with a respective group of data values, wherein each data value in the group of data values for a data element is defined in a first, uncompressed data format by a respective sequence of bits, and wherein the rounding circuit is configured to:
determine from the encoded representation of the array of data elements an initial sequence of bits for each data value in the group of data values for the data element, wherein the initially determined bit sequences represent the data values in the group of data values for the data element in the first, uncompressed data format but may have one or more missing bits corresponding to a respective one or more discarded bits for which data was not stored in the encoded representation;
identify from the initially determined bit sequences for the data values in the set of data values for the data element a pattern of missing bits for the group of data values associated with the data element; and
select the adjustment scheme based on the identified pattern of missing bits.

13. The decoder of claim 12, wherein the rounding circuit is configured to select the adjustment scheme based on the identified pattern of missing bits by comparing the identified pattern of missing bits with one or more predetermined patterns of bits that have been found to lead to problematic behaviour for at least one of the data values.

14. The decoder of claim 12, wherein when such a pattern of missing bits is identified, the selected adjustment scheme comprises setting one or more least significant bits for the at least one of the data values to zero.

15. The decoder of claim 11, wherein the array of data elements is an array of image data, and wherein the one or more data value(s) associated with each data element comprise a respective set of one or more colour value(s).

16. The decoder of claim 11, wherein the decoding circuit is configured to transform the decoded data value(s) obtained from the rounding circuit from a first, uncompressed data format into a second, uncompressed data format for use by a data processing system.

17. The decoder of claim 16, wherein the decoding circuit is configured to transform the decoded data value(s) from the first, uncompressed data format into the second, uncompressed data format by applying an inverse colour transform.

18. The decoder of claim 11, wherein the decoding circuit is configured to decode the encoded representation using associated metadata for the encoded representation, the associated metadata indicating one or more encoding parameters that were used to generate the encoded representation,
the decoding circuit further configured to determine from the associated metadata for the encoded representation the one or more encoding parameters that were used to generate the encoded representation and to generate therefrom an encoding hint comprising an indication of the one or more encoding parameters that were used to generate the encoded representation; and
the decoder further comprising an output circuit configured to output decoded data and to associate the encoding hint with the decoded data.

19. A decoder comprising:
a decoding circuit configured to decode an encoded representation of an array of data elements to determine a set of decoded data representing the array of data elements in a first, uncompressed data format, wherein the decoding is performed using associated metadata for the encoded representation, the associated metadata indicating one or more encoding parameters that were used to generate the encoded representation;
the decoding circuit further configured to determine from the associated metadata for the encoded representation the one or more encoding parameters that were used to generate the encoded representation and to generate therefrom an encoding hint comprising an indication of the one or more encoding parameters that were used to generate the encoded representation; and
the decoder further comprising an output circuit configured to output decoded data and to associate the encoding hint with the decoded data in such a manner that the one or more encoding parameters indicated by the encoding hint can be determined when the decoded data is subsequently to be encoded.

20. The decoder of claim 19, wherein associating the encoding hint with the set of decoded data comprises storing the encoding hint in the array of data elements using a set of respective bits from different data elements in the array.

* * * * *